US011148585B2

(12) United States Patent
Hawkins et al.

(10) Patent No.: US 11,148,585 B2
(45) Date of Patent: Oct. 19, 2021

(54) DECORATIVE COMPONENT FOR A VEHICLE WITH LIGHT EMITTING FINISH

(71) Applicant: LACKS ENTERPRISES, INC., Grand Rapids, MI (US)

(72) Inventors: Thomas Hawkins, Spring Lake, MI (US); David Walters, Shelbyville, MI (US)

(73) Assignee: LACKS ENTERPRISES, INC., Grand Rapids, MI (US)

( * ) Notice: Subject to any disclaimer, the term of this patent is extended or adjusted under 35 U.S.C. 154(b) by 54 days.

(21) Appl. No.: 16/791,211

(22) Filed: Feb. 14, 2020

(65) Prior Publication Data

US 2020/0262335 A1 Aug. 20, 2020

Related U.S. Application Data

(60) Provisional application No. 62/806,283, filed on Feb. 15, 2019, provisional application No. 62/855,375, filed on May 31, 2019.

(51) Int. Cl.
  *B60Q 1/26* (2006.01)
  *B60R 13/04* (2006.01)
  *F21V 3/06* (2018.01)

(52) U.S. Cl.
  CPC ............ *B60Q 1/2619* (2013.01); *B60R 13/04* (2013.01); *F21V 3/062* (2018.02)

(58) Field of Classification Search
  None
  See application file for complete search history.

(56) References Cited

U.S. PATENT DOCUMENTS

| 2004/0216406 A1* | 11/2004 | Egashira | B32B 33/00 |
| | | | 52/311.1 |
| 2017/0200403 A1 | 7/2017 | Salter et al. | |
| 2020/0045823 A1* | 2/2020 | Tomar | B60R 16/02 |

FOREIGN PATENT DOCUMENTS

| JP | 2005221661 | 8/2005 |
| JP | 2009006613 | 1/2009 |
| JP | 2010020047 | 1/2010 |

OTHER PUBLICATIONS

International Search Report PCT/US2020/018482, dated Sep. 14, 2020.

* cited by examiner

*Primary Examiner* — Ashok Patel
(74) *Attorney, Agent, or Firm* — Dickinson Wright PLLC

(57) ABSTRACT

A decorative component with a light emitting finish includes a transmissive portion including a resin material configured to carry light through the transmissive portion. A plateable portion is attached to the transmissive portion and includes a resin material configured to receive a metal material via electroplating. The plateable portion overlays a portion of the transmissive portion. A metal finish portion is applied to the plateable portion, and the metal finish portion overlays the plateable portion. A plurality of openings are defined by gaps in the finish portion and the plateable portion. Light carried by the transmissive portion exits the component through the openings.

26 Claims, 7 Drawing Sheets

FIG. 3
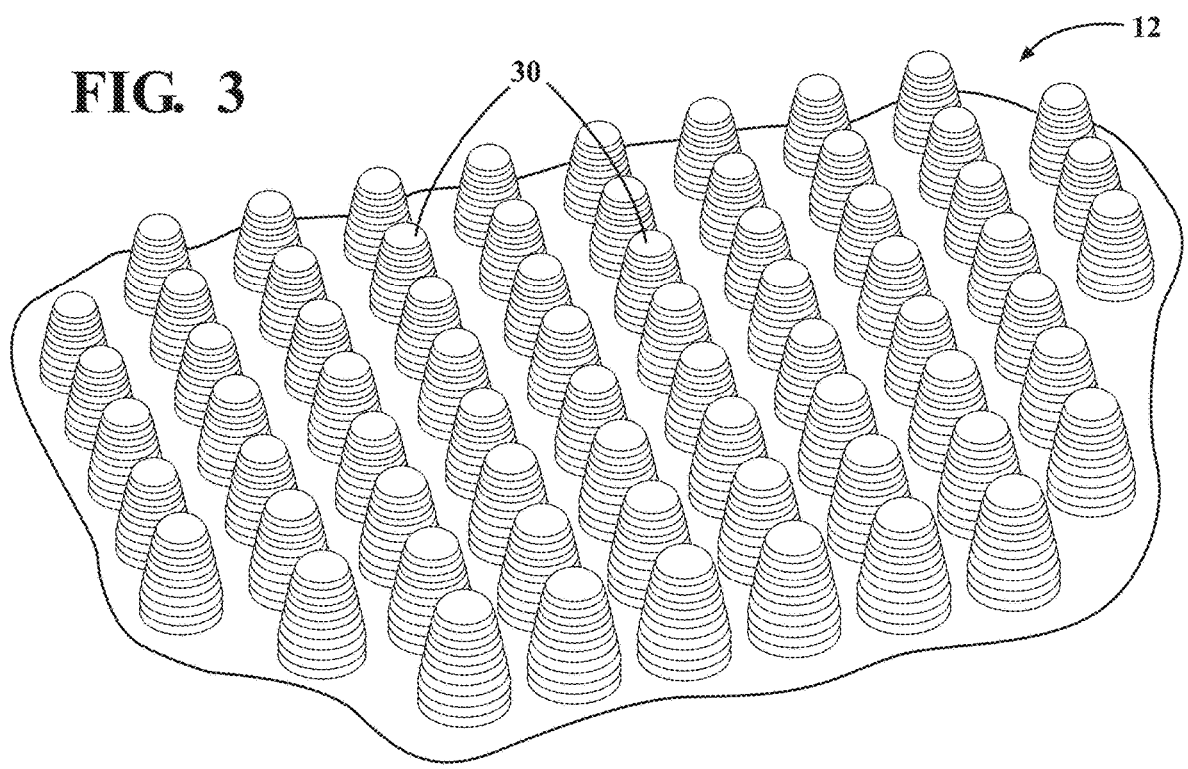
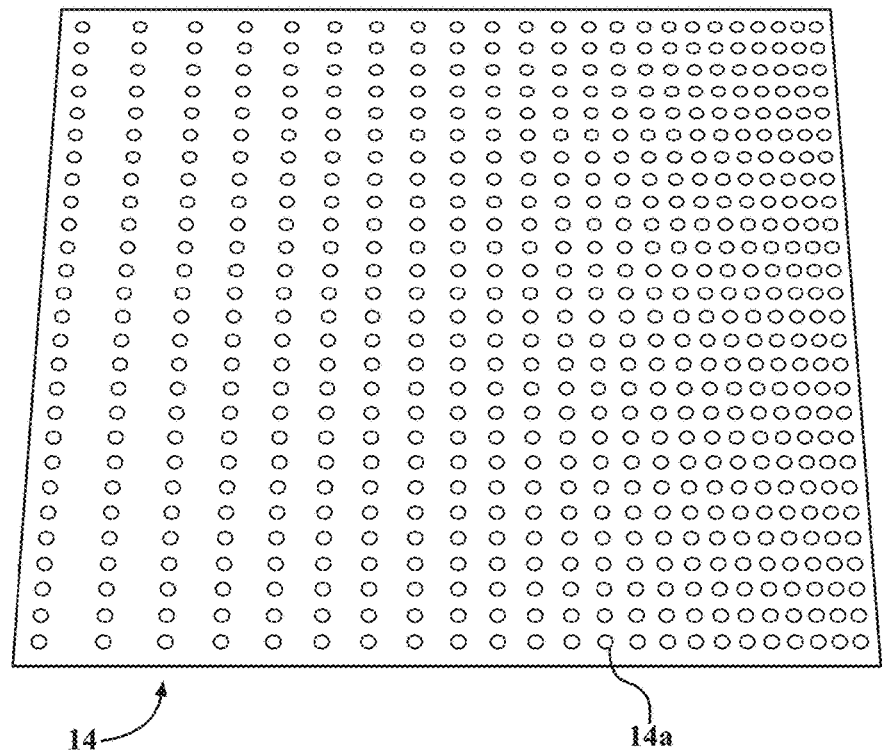
FIG. 4

DECORATIVE COMPONENT FOR A VEHICLE WITH LIGHT EMITTING FINISH

CROSS-REFERENCE TO RELATED APPLICATIONS

This application claims the benefit of previously filed U.S. Provisional Patent Application No. 62/806,283, filed Feb. 15, 2019, titled "Decorative Component with Light-Emitting Finish," and claims the benefit of previously filed U.S. Provisional Patent Application No. 62/855,375, filed May 31, 2019, titled "Decorative Component with Light-Emitting Finish," the entire contents of which are hereby incorporated by reference in their entirety herein.

FIELD OF THE DISCLOSURE

The present disclosure relates generally to decorative components. More specifically, the present disclosure relates to a decorative component for a vehicle having a chrome plated finish with light emitting capabilities.

BACKGROUND OF THE DISCLOSURE

This section provides a general summary of background information and the comments and examples provided in this section are not necessarily prior art to the present disclosure.

Consumer products, such as automobiles, typically contain a number of decorative elements, including vehicle logos and decorative metal surface finished parts, such as chrome plated elements, and lighted elements, such as headlights, tail lights, and the like. Decorative elements for consumer products may have a substantial effect on consumer purchase decisions. For example, vehicle grills may include a chrome finish to provide a shiny and appealing surface that contributes to the overall pleasing appearance of the vehicle. Consumers may be attracted to vehicles that achieve a distinctive appearance or to vehicles that establish a known appearance relative to a desirable vehicle brand. Vehicle manufacturers are constantly striving to design vehicles that have a pleasing appearance while keeping overall costs low. Similar aspects are present in other consumer products industries, such as in the furniture or appliance industry, or in the home electronics industry. For example, kitchen appliances may have a number of aesthetic design features.

Manufacturers presently seek solutions that can incorporate decorative elements, such as chrome plated elements, along with lighted elements in a single part. Some elements may be made using two shot or multi shot injection molding, and can include transparent or translucent portions along with other opaque portions, for example. Light may be transmitted through the transparent or translucent portions. Portions of decorative elements that are without chrome plating may be used as light pipes or lens covers, for example.

Chrome plated portions, however, cannot transmit light because the plating process deposits a thick layer of chrome material that blocks the light from being visible. Some decorative chrome parts may be made with physical vapor deposition (PVD), where a very thin film of or layer of chrome is deposited to the backside of a clear lens, and may transmit some light, but this process is insufficient to produce the typical chrome finish that consumers expect in many parts.

One manner of providing a component with selective plating to incorporate lighting aspects includes creating a logo, symbol, or graphics on a plated part using laser ablation. A molded plastic part may be made for example by injection molding from a material that is receptive to electroplating, such as ABS or ABS/PC. A print image such as a logo or symbol may then be applied to the material, with the material of the logo or symbol being a material that cannot be electroplated. Laser etching may then be used to further define the outline of the logo or symbol. The component is then passed on to an electroplating process, in which a chrome layer is applied to the component via electroplating. The chrome finish will hold to the portion of the component that is not covered by the logo or symbol, because the logo or symbol is not electroplateable. The symbol will therefore contrast with the chrome plating over the remainder of the component. The material of the symbol may be capable of passing light therethrough.

While this method allows for the selective application of a lighted portion of a chrome plated component, the process to achieve this result is cumbersome and includes multiple steps and machining setups. For instance, a first injection molding step is performed. The component is removed from the injection molding machine and the symbol is applied. The component is then passed to a laser etching machine. The component is finally passed to an electroplating setup. The various transporting of components between steps adds time and labor cost, as well as requiring substantial capital expenditure for each separate process. Moreover, this process is limited in that the resulting component cannot be transparent.

Another method includes the use of a two shot molding process to produce a multi-material component. In this approach, a component is injection molded in a first shot, producing a first portion of the component. This first portion may be a non-plateable resin. The component is then subjected to the second molding shot, where a second plateable material is applied. The second material covers a portion of the first material, leaving a single transmissive region where light can pass through. The component may be electroplated, leaving the single transmissive region free from the chrome material. The resulting effect may be a logo or symbol defined by the outline of the transmissive region, or it may be used to provide a light source, which is known as a contoured light region. This method is limited in that the resulting contoured light region results in a distinct non-chromed portion that is visible regardless of whether light is transmitted, because the contoured region is free from chrome material.

In view of the above, there remains a need for improvements to the composition and manufacture of decorative plated components with light emitting properties.

SUMMARY

According to an aspect, a decorative component is provided, the decorative component comprising: a transmissive portion comprising a resin material configured to carry light through the transmissive portion; a plateable portion attached to the transmissive portion and comprising a resin material configured to receive a metal material via electroplating, wherein the plateable portion overlays a portion of the transmissive portion; a metal finish portion applied to the plateable portion, wherein the metal finish portion overlays the plateable portion; a plurality of openings defined by gaps in the finish portion and the plateable portion, wherein light carried by the transmissive portion exits the component through the openings.

In one aspect, the transmissive portion is non-conductive and non-plateable via electroplating.

In one aspect, the transmissive portion includes a plurality of protrusions extending away from a base portion of the transmissive portion.

In one aspect, the protrusions and the base portion are homogenously, monolithically, and integrally formed.

In one aspect, the transmissive portion includes a plurality of integral protrusions extending away from a base portion of the transmissive portion, wherein the protrusions extend at least partially into the openings of the plateable portion.

In one aspect, at least one of the protrusions extends beyond an outer surface of the finish portion, and a portion of the finish portion extends along a side of the protrusion to define a blocked portion of the protrusion to block light from being emitted from the blocked portion.

In one aspect, the plurality of openings are spaced apart from each other at different distances.

In one aspect, the plurality of openings are arranged to define a logo.

In one aspect, the plateable portion has a variable thickness, and at least one of the plurality of openings is arranged at an oblique angle relative to an outer surface of the plateable portion.

In one aspect, the protrusions extend into the openings. In one aspect, the protrusions extend beyond an outer surface of the finish portion. In one aspect, the protrusions are recessed relative to an outer surface of the plateable portion.

In one aspect, the component includes at least one light source disposed adjacent the transmissive portion, wherein the transmissive portion is disposed between the light source and the plateable portion.

In one aspect, the transmissive portion defines a trough defining a cavity therein, wherein a projection of the plateable portion extends into the cavity.

In one aspect, the projection of the plateable portion is disposed between the light source and at least one of the plurality of protrusions to block light from light source.

In one aspect, a portion of the finish portion extends along a side of the protrusion to define a blocked portion of the protrusion to block light from being emitted from the blocked portion.

In one aspect, the transmissive portion includes one or more optics formed therein to direct light therethrough.

In one aspect, the transmissive portion is tinted or diffused.

In one aspect, the component includes a coating layer painted over a portion of the finish layer.

In one aspect, the component includes a plurality of lights disposed adjacent the transmissive portion, wherein the plurality of lights are illuminable at different times or sequenced to create an animated effect.

According to another aspect, a decorative component is provided, the decorative component comprising: a transmissive portion comprising a resin material configured to carry light through the transmissive portion; a plateable portion attached to the transmissive portion and comprising a resin material configured to receive a metal material via electroplating, wherein the plateable portion overlays a portion of the transmissive portion; a finish portion applied to the plateable portion, wherein the finish portion overlays the plateable portion; a plurality of openings defined by gaps in the finish portion and the plateable portion, wherein light carried by the transmissive portion exits the component through the openings; wherein the plateable portion includes a microtexture projecting outwardly therefrom.

In one aspect, the microtexture is overlaid by the finish portion.

In one aspect, the transmissive portion includes a plurality of integral protrusions extending away from a base portion of the transmissive portion, wherein the protrusions extend at least partially into the openings of the plateable portion, and the protrusions and microtexture combine to define a textured outer surface over a predetermined area.

In one aspect, in a lights off state the predetermined area has a generally consistent outer texture, and in a lights on state an illuminated pattern is defined by the protrusions within the predetermined area.

In one aspect, the component includes a plurality of lights disposed adjacent the transmissive portion, wherein the plurality of lights are operable in a predetermined sequence to create an animated effect.

In one aspect, the plateable portion blocks individual ones of the plurality of lights from individual ones of the plurality of openings.

In another aspect, a method of transmitting light from a decorative component is provided. The method includes: forming a transmissive portion comprising a resin material configured to carry light through the transmissive portion; forming a plateable portion attached to the transmissive portion and comprising a resin material configured to receive a metal material via electroplating, wherein the plateable portion overlays a portion of the transmissive portion; wherein the plateable portion includes a plurality of openings extending therethrough, wherein the transmissive portion is exposed through the openings; electroplating the plateable portion with a metal finish layer, wherein the transmissive portion remains exposed through the metal finish layer at the locations of the plurality of openings; transmitting light from a light source disposed adjacent the transmissive layer; transmitting light through the transmissive layer toward the plurality of openings; emitting light from the plurality of openings via the transmissive portion.

In one aspect, the transmissive portion includes a plurality of protrusions, the method further comprising inserting the plurality of protrusions into the plurality of openings.

In one aspect, the protrusions extend beyond an outer surface of the finish layer, the method further comprising emitting light laterally from the protrusions.

In one aspect, the plateable portion includes a microtexture projecting outwardly therefrom, wherein the protrusions and microtexture combine to define a textured surface over a predetermined area, the method further comprising illuminating a pattern defined by the protrusions within the predetermined area.

In one aspect, the transmissive portion defines a plurality of troughs with cavities therein, and the plateable portion projects into the cavities and extends between the light source and at least one of the openings.

In one aspect, the method further includes redirecting light passing through the transmissive portion via optics formed in the transmissive portion.

In one aspect, the method includes activating a plurality of lights in sequence to define an animation.

BRIEF DESCRIPTION OF THE DRAWINGS

The drawings described herein are for illustrative purposes only of selected aspects and not all possible implementations, and are not intended to limit the scope of the present disclosure.

FIG. 3 is a close-up perspective view of the transmissive layer of FIG. 2 illustrating protrusions thereof in accordance with an aspect of the disclosure;

FIG. 4 is a view of the transmissive layer and plateable resin layer in an assembled state illustrating the effect of a light source disposed behind the component in accordance with an aspect of the disclosure;

DETAILED DESCRIPTION OF THE DISCLOSURE

Example aspects of a decorative component with light emitting capabilities will now be more fully described. Each of these example aspects are provided so that this disclosure is thorough and fully conveys the scope of the inventive concepts, features and advantages to those skilled in the art. To this end, numerous specific details are set forth such as examples of specific components and methods associated with the decorative element to provide a thorough understanding of each of the aspects associated with the present disclosure. However, as will be apparent to those skilled in the art, not all specific details described herein need to be employed, the example aspects may be embodied in many different forms, and thus should not be construed or interpreted to limit the scope of the disclosure. According to an aspect, the decorative component may be employed as a vehicle component such as an interior or exterior trim component. However, according to another aspect, the decorative component may be utilized in a variety of other suitable industries and applications, including the furniture or appliance industries.

Figure 1:
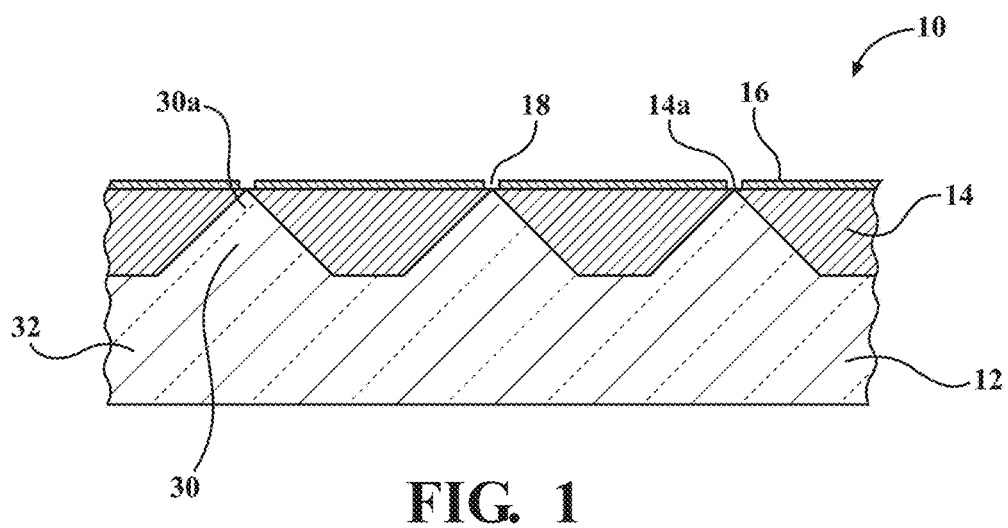
FIG. 1 is a schematic cross-sectional view of a decorative component having a light transmissive layer, a plateable resin layer, and metal finish layer, where light from the transmissive layer escapes through the metal finish layer in accordance with an aspect of the disclosure.

FIG. 1 illustrates a decorative component 10 capable of including a metal plated finish as well as light transmissive properties across a visible surface of the component 10. The component 10 may include a transmissive portion 12 and a plateable portion 14 that are molded together. The transmissive portion 12 and plateable portion 14 may be arranged such that the plateable portion 14 faces outward from the article on which it is mounted, such as a vehicle, with the transmissive portion 12 facing inward. The transmissive portion 12 and the plateable portion 14 may be molded together by either 2-shot molding or by joining together two separate molded pieces. The component 10 may further include an electroplated metal finish portion 16 that is applied to the plateable portion 14. Accordingly, the metal finish portion 16 may face outward.

Figure 11:
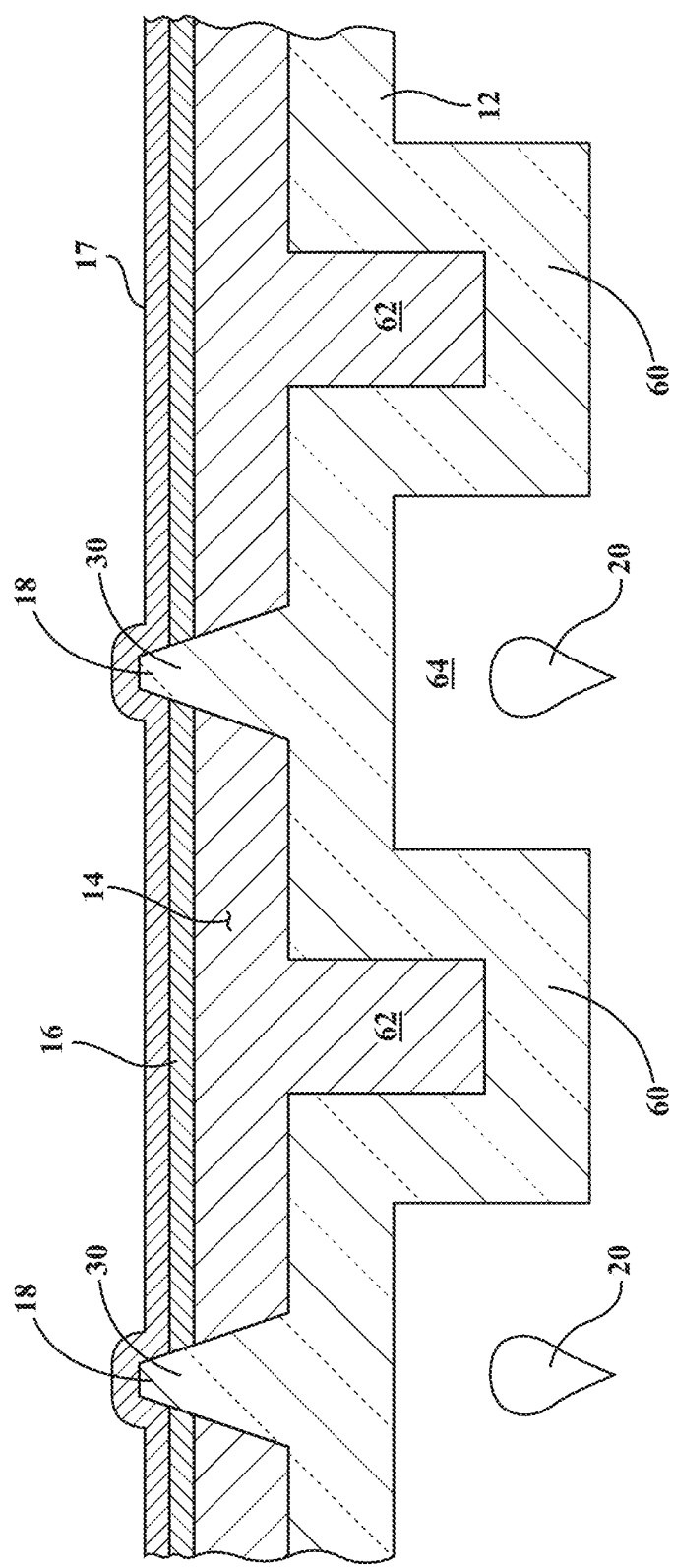
FIG. 11 illustrates an aspect of the disclosure illustrating separate light sources that may be used to light one or more protrusions, and further illustrates a clear or translucent color coating applied over the protrusions and the finish layer.

The finish portion 16 can include a plurality of gaps 18 defined in the finish portion 16, with the gaps 18 configured to allow light to pass through or exit through the finish portion 16 from the transmissive portion 12. Thus, both the emitted light and the finish portion 16 may be visible to users viewing the vehicle. According to an aspect, a coating 17, which may also be referred to as a topcoat, may be applied over the finish layer 16, transmissive portion 12, and/or the plateable portion 14. An example of the coating 17 is illustrated in FIG. 11, although it will be appreciated that the coating 17 may be applied similarly to other arrangements shown in other figures. The coating 17 may be clear, tinted clear, or translucent. According to an aspect, a light source 20 such as an LED may be disposed behind the light transmissive portion 12 to emit light therethrough, such as through the plurality of gaps 18. It will be appreciated that a single light source 20 may be employed to emit light through each of the gaps 18. Alternatively, a plurality of light sources 20 may be employed with each light source 20 emitting light through a respective one of the plurality of gaps 18. In one aspect, the light sources 20 may be different colors, have different intensities, or may be configured to vary the color and intensity of the light.

The transmissive portion 12 may be a generally rigid structured portion capable of acting as a base for the component 10. The transmissive portion 12 may be constructed of an appropriate resin material that is capable of transmitting light therethrough. The transmissive portion 12 may be made from a polycarbonate material that is transparent or translucent. It will be appreciated that the transmissive portion 12 may be formed of a variety of other suitable materials. According to an aspect, the transmissive portion 12 may be formed of a material that is clear or colored. Alternatively, the transmissive portion may contain a diffusing agent.

According to an aspect, the transmissive portion 12 may be made from a polycarbonate or other similarly transmissive material that is a non-plateable resin material and is resistant to electroplating, such that an electroplating process applied to the transmissive portion 12 would not result in the material of the electroplating processing adhering or bonding to the transmissive portion 12. The transmissive portion 12 may typically be in the form of an injection molded plastic structure. However, it will be appreciated that the transmissive portion 12 may also be constructed using other manufacturing methods if desired.

The plateable portion 14 may be disposed adjacent the transmissive portion 12, and can be fixed relative to the transmissive portion 12 to define a single structure. Put another way, when assembled, the plateable portion 14 may be bonded or adhered to the transmissive portion 12 in such a way that the plateable portion 14 is not separable from the transmissive portion 12 absent the use of cutting tools or the like. In another aspect, the transmissive portion 12 and the plateable portion 14 may be joined mechanically, such as being snapped together.

The plateable portion 14 may be in the form of a generally rigid plastic resin material. For example, the plateable portion 14 may be in the form of ABS or PCABS. However, it will be appreciated that other plateable resins may also be used. The plateable portion 14 may typically include an inorganic filler material that makes the resin material opaque. Accordingly, light may be blocked from passing through the plateable portion 14.

The plateable portion 14 is typically constructed using an injection molding process to define the rigid structural shape of the plateable portion 14. However, the plateable portion 14 may also be constructed or molded in other ways known in the art sufficient to form a plastic material such as the ABS or PCABS material, or the like. The plateable portion 14 may be formed of a variety of other suitable materials.

When molded or otherwise formed, the plateable portion 14 may define a plurality of gaps 14a disposed at a plurality of locations across an outer surface of the plateable portion 14. The gaps 14a may be in the form of openings or holes through the structure of the plateable portion 14. Accordingly, light may pass through the plateable portion 14 at the locations of the gaps 14a. The gaps 14a may have various shapes and sizes. For example, the gaps 14a may be generally circular, or they may have a square or other polygonal shape.

According to an aspect, when the plateable portion 14 is fixed to the transmissive portion 12, light passing through the transmissive portion 12, which may be acting as a light pipe or the like, can exit through the plateable portion 14 via the gaps 14a. Light will not pass through the solid parts of the plateable portion 14, and therefore the distribution and arrangement of the gaps 14a within the plateable portion 14 will accordingly define the distribution of light that passes through the component 10 when light is transmitted through the transmissive portion 12.

The finish portion 16 may be applied over the outer surface of the plateable portion 14. The finish portion 16 may include a metal material applied in layers to define a chrome finish on the component 10. The finish portion 16 may be applied over both the transmissive portion 12 and plateable portion 14, with the finish portion 16 adhering or bonding only to the plateable portion 14. The finish portion 16 may be applied to the plateable portion 14 via an electroplating process, in which an electric current passes through plateable portion 14 or a coating thereof, and the current does not pass through the transmissive portion 12, which is non-conductive. The finish portion 16 may not adhere or bond to the transmissive portion 12 due to the non-plateable properties of the transmissive portion. Accordingly, the finish portion 16 may have approximately the same surface area as the plateable portion 14. According to another aspect, the coating or topcoat 17 may be disposed over the surface of the component to provide protection and minimize surface scratching and marring. The coating or topcoat 17 could be clear or tinted in order to provide further enhanced aesthetics. According to a still further aspect, the curing chemistry of the coating or topcoat 17 may be either thermal or UV. It will be appreciated that the coating or topcoat 17 could be selectively applied only to the finish portions 16 or other portions of the component.

According to another aspect, the finish portion 16 may be applied in layers to have a resulting thickness that is sufficient to prevent light from passing through the finish portion 16. Accordingly, in the event the plateable portion 14 is formed of a material having some translucent properties that may allow some light to pass through the solid portions of the plateable portion 14, the finish portion 16 will ultimately block this incident light due to the thickness of the finish portion 16.

Due to the finish portion 16 bonding to the plateable portion 14, the finish portion 16 thereby includes the gaps 18, which correspond generally in size and shape to the gaps 14a defined by the plateable portion 14. It will be appreciated, however, that some cohesion of the material of the finish portion 16 may result in the gaps 18 being slightly smaller or slightly larger than the gaps 14a defined by the plateable portion 14.

According to another aspect, when light is carried through the resin of the transmissive portion 12, the light will exit the component 10 through the small openings defined by the gaps 14a and 18. For purposes of further discussion, the gaps 18 defined at the outermost surface of the finish portion 16 will be described, with it being understood that the gaps 14a defined by the plateable portion 14 are disposed coincident with the outermost gaps 18. The shape of the gaps 18 may generally correspond to the shapes of the gaps 14a.

The gaps 18 may be arrayed in virtually any fashion to define the profile of the lighted effect. For example, the gaps 18 may be randomly dispersed across a given outer surface area of the component 10. Alternatively, the gaps 18 may be uniformly dispersed across a given outer surface area. The gaps 18 may also be dispersed randomly over one area and uniformly over another. The gaps 18 may be dispersed over substantially the entire outer visible surface of the component 10, or they may be dispersed over only a portion of the outer visible surface of the component 10.

The gaps 18 may be arranged in a shape or pattern to collectively form a design, symbol, text, graphic, or specific indicia shape. Within this specific shape, the gaps 18 may be arranged randomly, uniformly, or a combination of random and uniform. The gaps 18 may be arranged in such a way the gaps 18 in one section of the component 10 may be closer together relative to the spacing of the gaps 18 in another section of the component 10. The spacing of the gaps 18 across the component may decrease or increase in a given direction. For example, when moving from left to right (or other directions) on the component 10, the gaps 18 may become progressively smaller or larger.

In addition to the various spacial arrangements of the gaps 18 relative to each other to define different overall shapes or distances between adjacent gaps 18, the gaps 18 may also have various shapes. For example, the individual gaps 18 may have a circular shape, a triangular shape, a square shape, a rectangular shape, or the like. The individual gaps 18 may have other shapes, such as a T-shape, a star shape, a plus sign, or the like. The gaps 18 may also be shaped in the form of a small logo, such as brand logos. All of the gaps 18 may be the same shape, or the gaps 18 may be different shapes within the same pattern or profile.

The gaps 18 may further have various sizes. According to an aspect, the gaps 18 are sufficiently small such that the effect of light emitting from the gaps 18 gives the impression of the metal plated component 10 being translucent in the area where the gaps 18 are dispersed. However, there may be a range of sizes of the gaps 18 that produce this effect. The effect may be achieved relative to different viewing distances. For example, smaller gaps 18 may provide the translucent effect even when viewed closely. Larger gaps 18 may provide the effect when viewed from a greater distance. The gaps 18 may be different sizes within the same pattern or profile.

For the light carried through the transmissive portion 12 to reach the gaps 18 and the outer surface of the component 10, the transmissive portion 12 may be shaped to provide a path through the resin toward the gaps 18. Accordingly, the transmissive portion 12 may include a plurality of protrusions 30 that extend upward from a base 32, with the protrusions 30 and the base 32 combining to define the transmissive portion 12. Reference to the protrusions 30 extending upward is relative to the base 32 when the base 32 is below the protrusions 30, and it will be appreciated that other orientations of the base 32 would therefore change the direction that the protrusions 30 extend. Put another way, the protrusions 30 extend from the base 32 in a direction away from the base 32.

The protrusions 30 may have different shapes. As shown in FIG. 1, the protrusions have a triangular cross-sectional shape. In this approach, the protrusions 30 may have a pyramidal shape or a conical shape to create the triangular cross-sectional shape. The protrusion 30 is wider at its interface with the base 32, and tapers down to an outer point 30*a*. It will be appreciated that the outer point 30*a* may have various shapes, such that it may be a point with rounded end or a blunt end.

The protrusions 30 may alternatively have a more gradual taper, such that the outer end of the protrusion 30 is not a point, but instead a reduced thickness relative to the interface with the base 32. In another approach, the protrusions 30 may have a generally constant thickness along their extension from the base 32.

The protrusions 30 may have an outer profile when viewed from above that defines a cross-sectional shape, such as a triangle, square, circle, or other shape. This outer profile may be applicable to protrusions 30 that taper or protrusions that do not taper.

In one form, the protrusions 30 may have a hemi-spherical or rounded shape, such as a taper that is not constant along the extension away from the base 32. It will appreciated that various other forms of protrusions 30 extending from the base 32 may alternatively be used, so long as the protrusion provides a path for light to be carried therethrough to pass from the base 32 toward to the gaps 18. It will also be appreciated that the protrusions 30 may extend so they are flush with an upper surface of the plateable portion 14. Alternatively, the protrusions 30 may project though the gaps 18 and beyond the upper surface of the plateable portion. The protrusions 30 may also be set back from the plateable portion 14.

For purposes of further discussion, the protrusions 30 will be referred to as having a cone-shape, with a circular cross-section when viewed from above and a triangular cross-section when viewed from the side, and tapered from a wider portion at the interface with the base 32 and narrowing to the outer point 30*a* described above.

Similar to the gaps 18, the protrusions 30 may be dispersed on the base 32 in a random or uniform manner. The protrusions 30 may also be dispersed in a non-random controlled manner, but not necessarily uniform. For example, the protrusions 30 may be dispersed closer together in one area of the base, and the protrusions 30 be spaced further apart at different distances, resulting in a gradual change in the density of protrusions 30 dispersed on the base 32.

Similar to the gaps 18, the protrusions 30 may be arranged in a variety of patterns or shapes, and may have different individual sizes or shapes. According to an aspect, the arrangement of the protrusions 30 may conform to the arrangement of the gaps 18, such that the light passing through the transmissive portion will be routed to the various gaps 18 such that the light may exit the component at the gaps 18. Thus, it will be appreciated that various types and arrangements of the gaps 18 or the protrusions 30 described herein may also be applied to either the gaps 18 or protrusions 30.

The protrusions 30 extending from the base 32 will accordingly define a void or space between each of the individual protrusions 30. This void or space between the protrusions 30 may be filled by the material of the plateable portion 14. Thus, the shape of the plateable portion 14 will preferably conform to the negative shape of the protrusions 30 and the space between the protrusions 30. Accordingly, when separate pieces, the plateable portion 14 may be placed on the transmissive portion 12, with the gaps 18 receiving the protrusions 30 therein.

For example, when the protrusions 30 are in the form of cones or the like, the plateable portion 14 may have a corresponding arrangement of cone-shaped recesses that define the gaps 14*a* into which the protrusions 30 will extend when the transmissive portion 12 and the plateable portion 14 are joined together. The recesses that define the gaps 14*a* are therefore defined in a generally homogeneous sheet of material that makes up the plateable portion 14.

Figure 2:
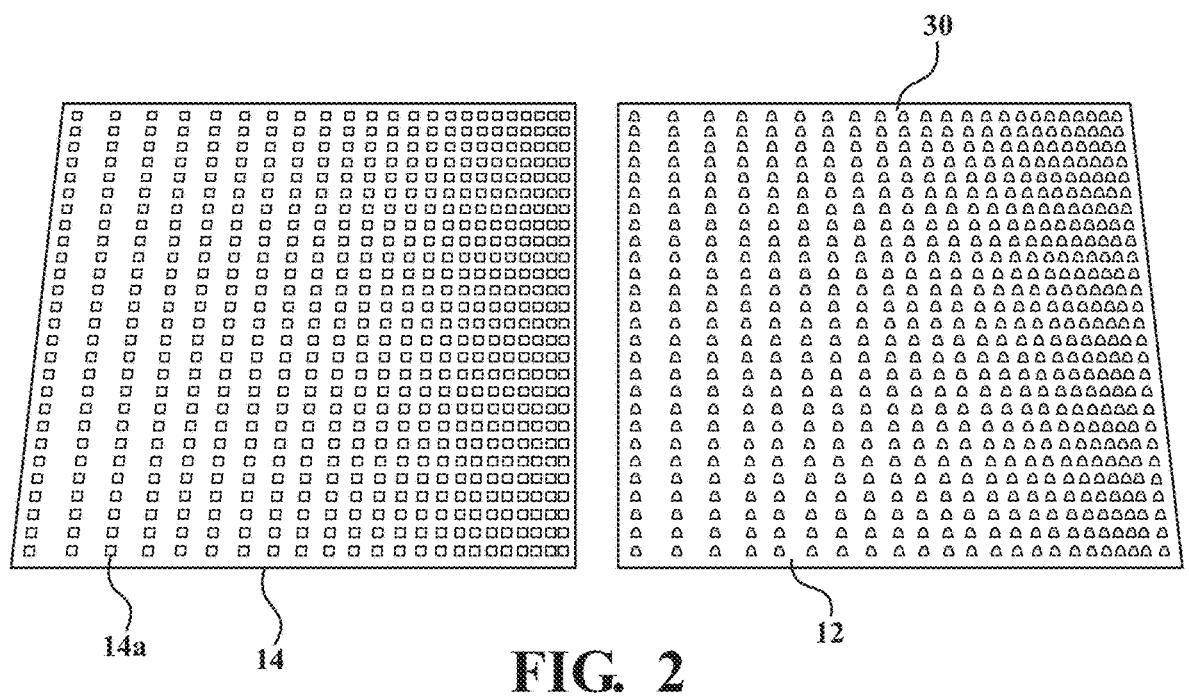
FIG. 2 is an exploded view of the transmissive layer and the plateable resin layer in accordance with an aspect of the disclosure.

As shown in FIG. 2, the plateable portion 14 is shown on the left side of the figure, and the transmissive portion 12 is shown on the right side of the figure. When assembled together, the plateable portion 14 may overlay the transmissive portion 12. The transmissive portion 12 is shown with a non-uniform, but controlled and non-random, spacing of the protrusions 30 across the sheet that defines the transmissive portion 12 in this illustration. On the upper left portion of the transmissive portion 12, the protrusions 30 are spaced further apart than on the lower right portion of the transmissive portion 12.

Similarly, the gaps 14*a* of the plateable portion have the same spacing as the protrusions 30, with the upper left gaps 14*a* being spaced further apart and the gaps 14*a* on the lower right being spaced closer together. Thus, when assembled, the many protrusions 30 will be received in the many recesses of the plateable portion 14 that define the gaps 14*a*.

Additionally, when outside light hits the plateable portion 14 at certain angles, the gaps 14*a* may become difficult to see. However, when light is passed through the gaps 14*a*, the gaps 14*a* would become illuminated, and an illusion of transparency or translucency is achieved.

FIG. 3 further illustrates the protrusions 30. In this view, the protrusions 30 are arranged in rows, and the space between the rows is clearly visible. The protrusions 30 may have ridges or other optical enhancement structures formed thereon, as discussed herein. These ridges are not necessary for the protrusions 30 to allow light to pass. As stated above, the protrusions 30 can have various sizes, shapes, and spacing.

With reference to FIG. 4, the transmissive portion 12 is assembled with the plateable portion 14, and a light may be applied to the rear of the assembly (transmissive portion 12 is behind the plateable portion in FIG. 4). Light may pass through the transmissive portion 12 and is visible through the plateable portion 14 due to the light being carried through the transmissive portion 12 and the protrusions 30 extending into the plateable portion 14.

The transmissive portion 12 and the plateable portion 14 may be formed and joined together in different ways, as further described below, in constructing the overall component 10.

In one approach, the transmissive portion 12 is first molded in a multi-shot or two shot injection-molding device. Following formation of the transmissive portion 12, the mold may be rotated within the molding device, and a second portion of the molding device may be filled with the material of the plateable portion 14. This process will create a solid component with the transmissive portion 12 overlaid with and secured to the plateable portion 14. This assembly may then be passed on to a standard plating on plastic process including electroplating, in which the plateable portion 14 will selectively receive the decorative metal electroplated finish portion 16, and the non-plateable transmissive portion 12 will not receive the decorative metal finish material.

The selection of the resin type for both the transmissive portion 12 and the plateable portion is important to the molding and plating process. The resin of the transmissive portion 12 must be of a type that is capable of transmitting light and capable of bonding with the material of the plateable portion 14, and the transmissive portion 12 must also be inert to the electroplating portion of the process (non-conductive). The resin material of the plateable portion 14 must be able to be bonded to the material of the transmissive portion 12, and it must be able to carry current when subjected to the electroplating portion of the process. Various types of material combinations having these characteristics may be used.

In another approach, a traditional overmolding process may be used. The transmissive portion 12 may be molded into the desired shape. The molded transmissive portion 12 may then be removed from the mold and transferred to a second mold cavity, where the second mold cavity where the resin material of the plateable portion 14 is then molded over the transmissive portion 12. The overmolded assembly of the transmissive portion 12 and the plateable portion 14 may then be passed on the electroplating process described above.

In yet another approach, the transmissive portion 12 and the plateable portion 14 may be molded separately and then joined together via welding, bonding, adhesives, or other methods of joining two plastic parts together. The assembly may then be subjected to the electroplating process as described above.

The transmissive portion 12 and the plateable portion 14 will therefore interface with each other to define the exit path for the light being passed through the transmissive portion 12. The way in which the light exits the component 10 depends on the specific relative geometry of the transmissive portion 12 and the plateable portion 14, and is also dependent on the shape of the protrusions 30.

Figure 5A:
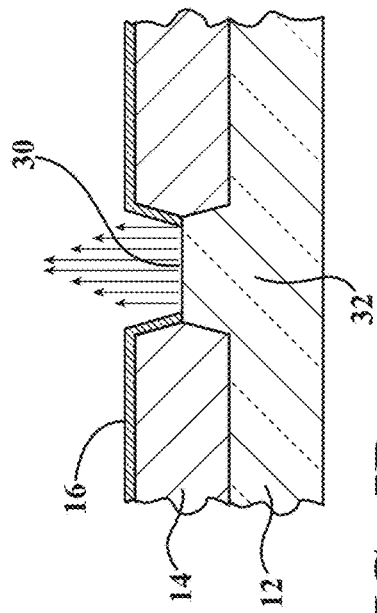
FIGS. 5A and 5B illustrate alternative aspects of the protrusions of the transmissive layer in accordance with an aspect of the disclosure.
Figure 5B:
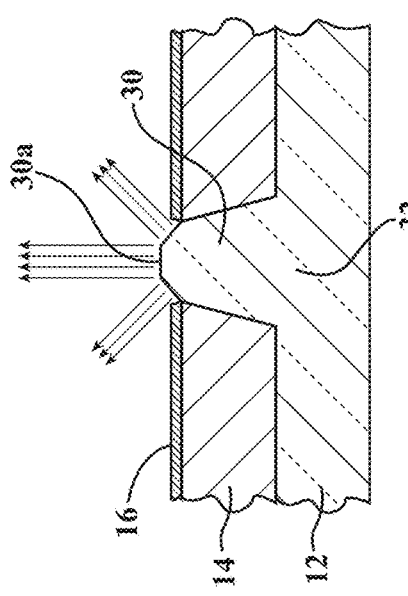

With reference to FIGS. 5A and 5B, the protrusions 30 of the transmissive portion 12 may be arranged to project at different heights relative to the plateable portion 14, as well as the finish portion 16 that is applied to the plateable portion 14 and that defines the outer surface. In one approach, the protrusions 30 extend beyond the outer surface defined by the finish portion 16, as shown in FIG. 5A. In another approach, the protrusions 30 extend to a recessed point relative to the outer surface defined by the finish portion 16, as shown in FIG. 5B. In yet another approach (shown in FIG. 6), the protrusions 30 extend to a point that is generally flush with the outer surface defined by the finish portion 16.

The illustration in FIG. 5A shows the protrusion 30 extending beyond the outer surface of the plated finish portion 16, such that the protrusion is proud over the plated area. In this form, light escapes through the gaps 18 defined by the finish portion via the extended protrusion 30, with the light escaping in a direction normal to the surface of the finish portion 16 as well as escaping in lateral directions relative to the extension of the protrusion 30. This arrangement allows light to spread in a broader pattern.

The illustration in FIG. 5B shows the protrusion 30 being recessed below the surface of the finish portion 16. In this approach, the light will escape in a direction normal to the surface of the finish portion 16. However, the light will be limited from escaping in a lateral direction because the finish portion 16 blocks the light in this direction. Accordingly, this arrangement allows light to spread in a narrower pattern.

In view of the above, it will be appreciated that the degree to which the protrusion extends beyond the surface of the finish portion 16 or is recessed relative to the surface of the finish portion 16 will thereby affect the spread of light escaping through the gaps 18. The greater the protrusion 30 extends, the broader the spread of the light, and the greater the protrusion 30 is recessed, the narrower the spread of light. In various Figures, the protrusions 30 are illustrated as a shape that reaches a point. However, other shapes may also be used. For example, the protrusion 30 could have a linear shape, a strip shape or bar shape, or some other longitudinal shape.

Figure 6:
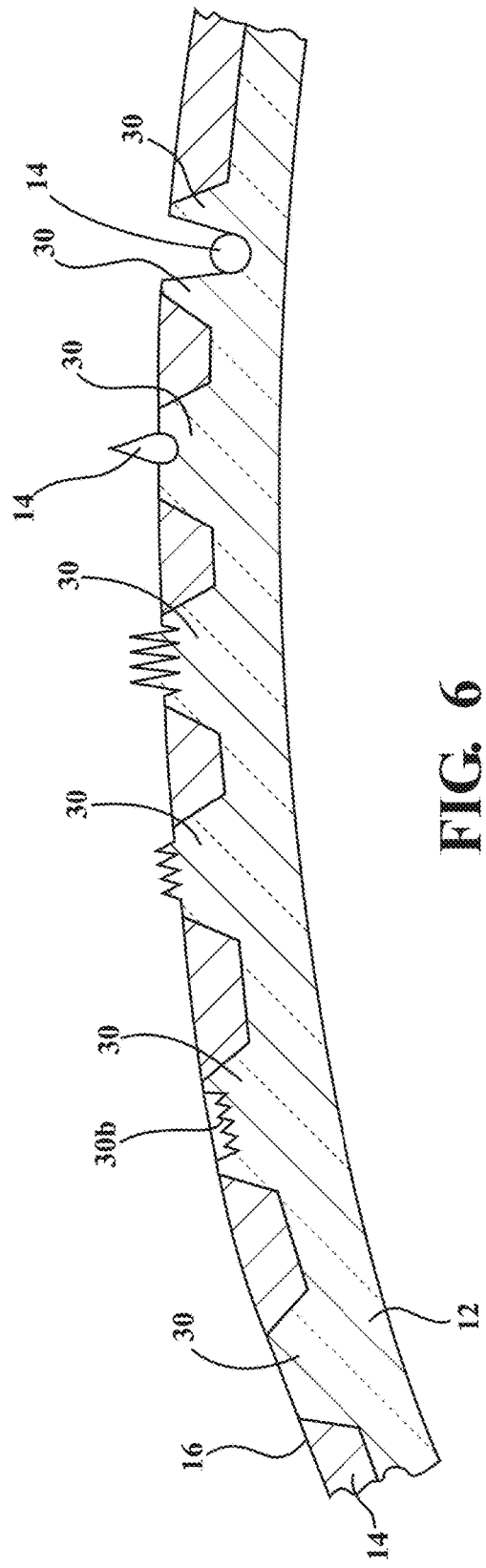
FIG. 6 illustrates alternative aspects of the protrusions and the plateable resin layer in accordance with an aspect of the disclosure.

The protrusions 30 may also act as lenses depending on their shape. The protrusions 30 may shaped in a number of ways to direct light or diffuse light, as shown in FIG. 6. FIG. 6 illustrates different lens shapes for the protrusions, and different shapes of the plateable portion 14 or finish portion 16. The protrusions 30 may include roughened portions 30b that diffuse light. The roughened portions 30b may be disposed across an entire surface of the protrusion 30, or a portion of the protrusion 30. The roughened portions 30b may have different degrees of roughness. The protrusions 30 may include recesses or cavities formed in an outer surface thereof. The protrusions 30 acting as lenses can be various shapes within the same component 10. Indeed, it may be desirable to have different shapes of the protrusions 30 to create different lens styles to allow for focusing some light that escapes and diffusing other portions of the light that escapes.

Figure 7:
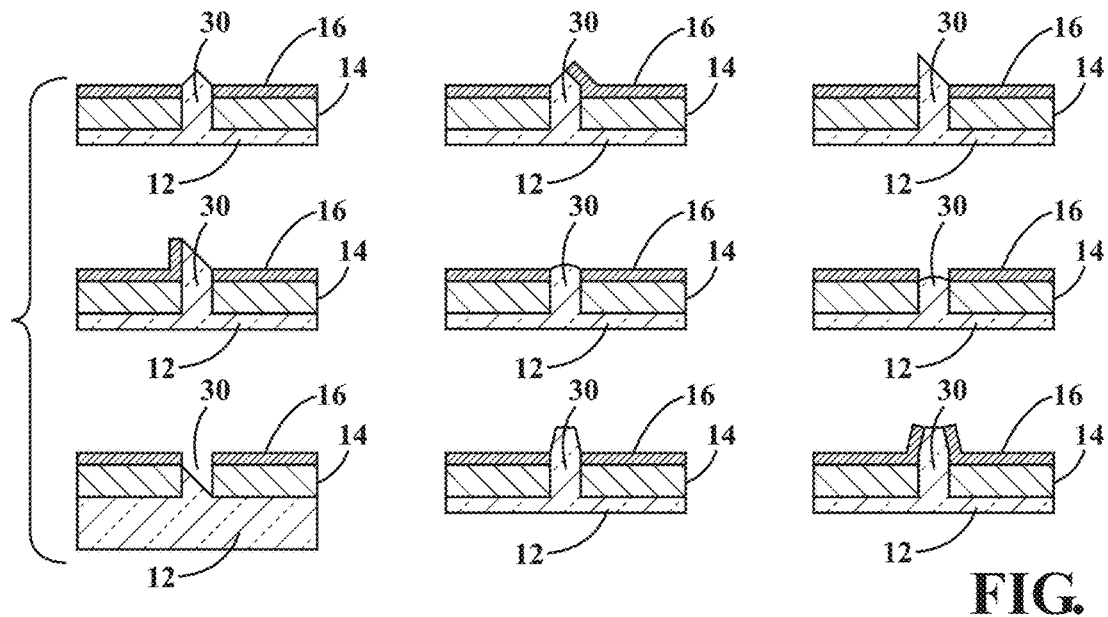
FIG. 7 illustrates further alternative aspects of the protrusions of the transmissive layer relative to the plateable resin layer and the finish layer in accordance with an aspect of the disclosure.

FIG. 7 illustrates further examples of shapes of the protrusions 30 that can control the manner in which the light exits the component 10. For example, one protrusion may be triangular shaped and extending beyond the surface of the finish portion, with light being directed in opposing lateral directions. One side of the protrusion 30 may be roughened to diffuse the light, with the other side remaining smooth. The various orientations will direct the light in a manner understood in the art, and roughening different surfaces of the protrusion 30 will diffuse the light exiting via that roughened surface. It will be appreciated that various configurations shown in FIG. 7 are examples and that additional configurations of the protrusions 30 themselves and also relative to the plateable portion 14 and the finish layer 16 are possible. In some aspects, a portion of the side of the protrusion 30 may be blocked by the finish layer 16 to block light in that direction and direct light in the opposite direction where the protrusion 30 is not blocked.

Figure 8:
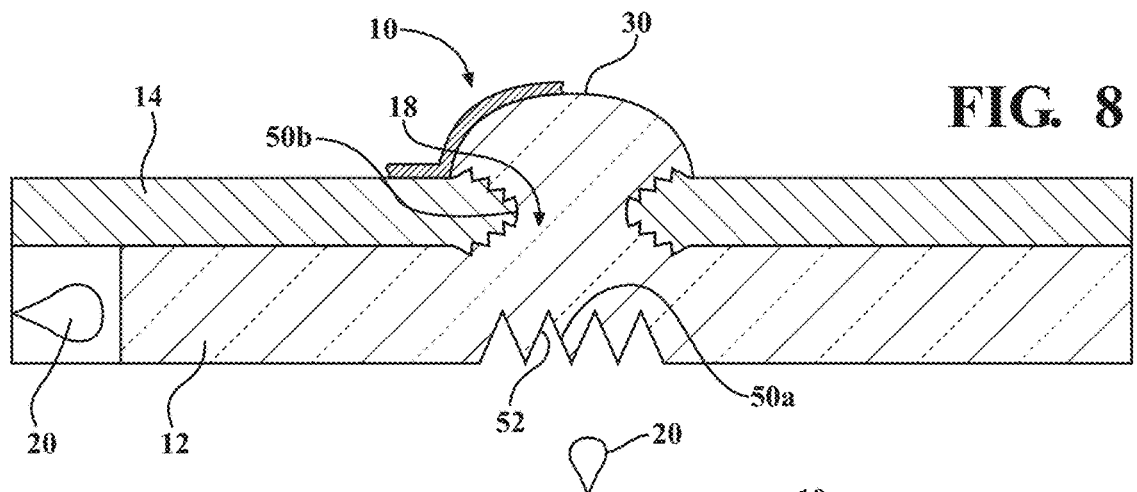
FIG. 8 illustrates another aspect of protrusions with molded-in optics in accordance with an aspect of the disclosure.

FIG. 8 illustrates another aspect of the present disclosure. According to this aspect, the component 10 includes a transmissive portion 12 and a plateable portion 14. The transmissive portion 12 includes a protrusion 30 that extends through the gap 18 such that it projects beyond the plateable portion 14. As shown, the light source 20 may be disposed to the side of the transmissive portion 12 such that light emitted from the light source 20 passes through the transmissive portion parallel to the finish surface. According to an aspect, the transmissive portion 12 includes a plurality of molded-in optics 50a, 50b that redirect light such that it will be directed through the gap 18. As shown, the molded-in optics 50a may be formed in a bottom surface 52 of the transmissive portion or alternatively, they are molded in a location parallel to the direction of light emitted from the light source 20 and beneath the gap 18. According to another aspect, the transmissive portion 12 includes molded-in optics 50b that are located at either side of the gap 18 in the plateable portion. These optics help in directing light out of the gap 18 and to the exterior of the component 10. It will be appreciated that the optics 50a, 50b can take on a variety of different forms.

Figure 9:
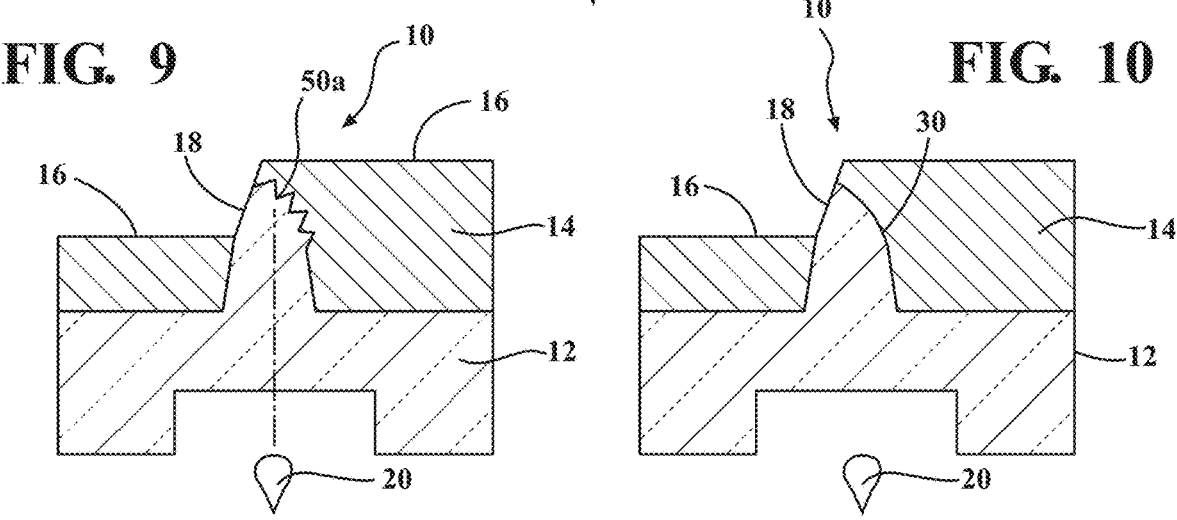
FIG. 9 illustrates still another protrusion configuration with molded-in optics in accordance with an aspect of the disclosure.
Figure 10:
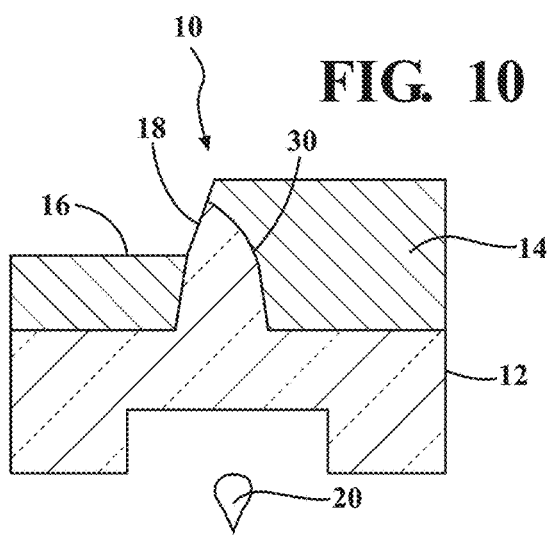
FIG. 10 illustrates the protrusion configuration of FIG. 9 without molded-in optics.

According to another aspect shown in FIGS. 9 and 10, the component includes a light source 20 disposed behind the transmissive portion 12 and configured to emit light in a direction generally perpendicular to the gap 18. As shown, the plateable portion is formed such that the finish portion 16 is located in different planes. As shown, the gap 18 is formed at an acute angle with respect to the protrusion 30. In other words, the gap 18 is located generally adjacent a side of the protrusion 30 as opposed to the tip as shown in accordance with other aspects. The transmissive portion 12 can include a plurality of molded-in optics 50a formed adjacent a side of the protrusion 30 opposite the gap 18 (FIG. 9). The molded in optics 50a can help direct the light through the gap 18. Alternatively, the protrusion 30 may be formed without any molded-in optics as shown in FIG. 10.

According to a still another aspect, as illustrated in FIG. 11, the component 10 could be formed to have different zones that are isolated from one another and provide different lighted effects. Each of these zones could have its own different light source 20. According to an aspect, the lights 20 could be sequenced to provide an animating effect on the surface of the part. The animating effect could be provided by sequencing lights of the same color in pulsating fashion. Alternatively, the animating effect could be provided by sequencing light of different colors in different fashion. It will also be appreciated the different animating effects could be provided by utilizing the transmissive portion 12 formed of different colored materials with the different colored portions corresponding to the zones such that the different effects could be provided by lights having the same colors.

FIG. 11 also illustrates the coating 17 that is applied over the finish layer 16 and the protrusions 30, where the coating can be clear, clear tinted, or translucent. In another aspect, the coating 17 could be opaque or painted. In one aspect, as shown in FIG. 11, the transmissive portion 12 has an undulating cross-section with downwardly projecting troughs 60 defining outer cavities 62, with the light sources 20 disposed in recesses 64 formed by the undulations, and the plateable portion 14 extending into the cavities 62 formed by the undulations. Thus, light from one of the lights sources 20 may be blocked from reaching adjacent protrusions 30 by the downwardly extending portion of the resin layer 14, and may be generally limited to being emitted from the protrusion 30 that is located above the light source 20 or other protrusions 30 that are not blocked by the plunging portion of the resin layer 14. Put another way, separate lights 20 can be used to light one or more "holes," and individual "light pipe holes" may be isolated from each in other in a single transmissive portion 12. Separate lights 20 may be used to light one or more holes or gaps 18. The lights 20 may be the same or different colors, which can be turned on or off at different times, or coupled together to create animation. FIG. 11 illustrates the protrusions 30 extending beyond the plateable portion 14 and the finish layer 16, but it will be appreciated that the various aspects of the protrusions described herein may be used in the arrangement shown in FIG. 11.

Figure 12:
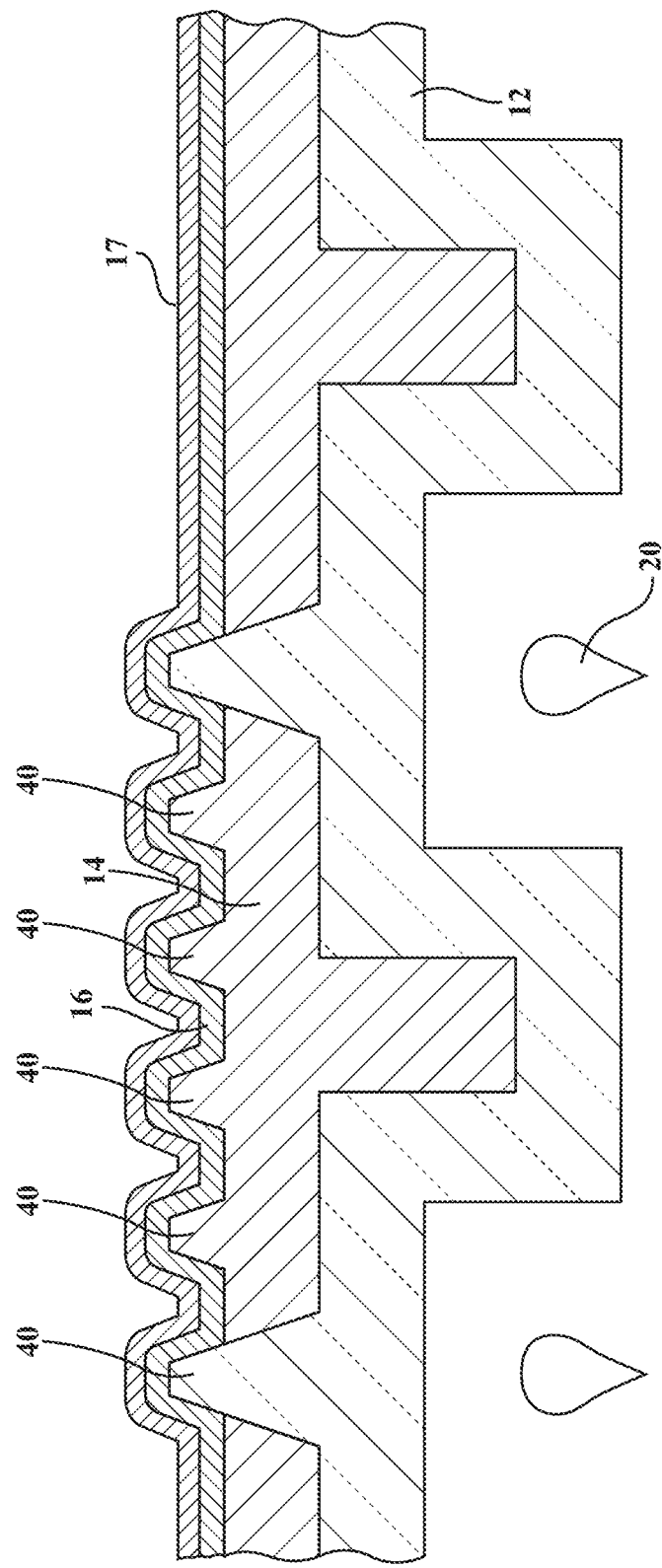
FIG. 12 illustrates an aspect of the disclosure illustrating a microtexture defined by the plateable resin layer in accordance with an aspect of the disclosure.

In another aspect, as shown in FIG. 12, the decorative component 10 may be arranged similar to the component 10 shown in FIG. 11, but with the addition of a microtexture 40. The microtexture 40 may be formed in the plateable portion 14. As described above, the plateable portion 14 may be a molded component that is joined with the transmissive portion 12, which may also be molded. The plateable portion 14 and transmissive portion 12 may be joined together after being molded or may be joined together in a two-shot molding process, such that a single joined component is provided by the molding process.

The microtexture 40 may be in the form of a protrusion, similar to the protrusion or lens 30 described above that is formed as part of the transmissive portion. Unlike the protrusion 30 of the transmissive portion, the microtexture 40 may not operate as a lens. Rather, the microtexture 40 may act to mimic the protrusion 30 of the transmissive portion 14 as part of a textured outer surface that is ultimately visible for the component 10. Accordingly, the microtexture 40 may have the same or similar outward shape and appearance as the protrusions 30.

Thus, the microtexture 40 and the protrusions 30 may combine to define an overall outer pattern or shape that projects or protrudes from the outermost surface of the component. The pattern may be arranged to define a variety of appearance types, such as a logo, shape, text, symbol, or other decorative pattern.

The microtexture 40 may be arranged as a repeating unit over a predetermined and desired outer-facing area of the component. Thus, the microtexture 40 may be defined as a plurality of repeating protrusions or projections. Each of the projections defining the microtexture 40 may be spaced apart from each other in a generally constant spacing arrangement. Alternatively, the microtexture 40 projections may be spaced apart at varying spacing, such that some of the projections may be closer to each other than others. The spacing between projections of the microtexture 40 may also be random. The spacing between projections of the microtexture 40 may vary in a progressive manner, such that the projections at one end of the pattern may be close and the spacing may increase at relatively further away locations.

With the microtexture 40 being formed as part of the plateable portion 14, the microtexture 40 is plateable, and is generally not light-transmissive. Put another way, light generated by the light sources 20 will typically not be emitted from the microtexture 40. Accordingly, the inclusion of the microtexture 40 on the plateable portion 14 will generally not affect the light-emitting appearance of the component 10 when the light sources 20 are activated. Thus, with regard to the light-emitting appearance of the component 10 having the microtexture 40 and the component 10 that does not have the microtexture 40, the shape or pattern that emits light will generally be the same.

Thus, the inclusion of the microtexture 40 may have a greater relative effect on the non-activated appearance of the component 10.

As described above, the microtexture 40 is plateable, being part of the plateable portion 14. Thus, with reference to the above aspects regarding the plating of the plateable portion, the finish portion 16 may be applied over the microtexture 40 and the plateable portion 14 in the manner previously described. The finish portion 16 will be plated over the microtexture 40 as well as the remainder of the plateable portion 14. Accordingly, the resulting outer surface of the finish portion 16 may have a plurality of projections, bumps, texture, or the like corresponding to the location of the microtexture 40.

Due to the protrusions 30 of the transmissive layer 12 that extend through the plateable layer 14, a plurality of openings or holes are defined in both the plateable layer 14 and the finish portion 16 that is applied to the plateable layer 14. The protrusions 30 therefore have the effect of being "inserted" within the projections of the microtexture, creating an overall textured surface of different types of protrusions or projections. Thus, the protrusion 30 (acting as a lens) will extend through the holes or openings and may mimic the geometric feature present in the plated finish portion 16.

Accordingly, when the light sources 20 are off, the outward appearance of the component 10 may have a generally consistent textured appearance. The non-plated protrusions 30 may blend into the textured outer surface such that the protrusions 30 are difficult to detect absent close inspection. Rather, the component 10 will appear simply as having a textured outer surface.

When the light sources 20 are activated, the shape or pattern corresponding to the protrusions 30 acting as lenses will be illuminated as described above in reference to previous aspects. The microtexture 40 will remain in a non-illuminated state, providing a textured feature that complements the illuminated pattern.

Additionally, as described above with reference to FIG. 11, the topcoat 17 may be applied over both the finish layer 16 and the protrusions 30. The topcoat 17 may be colored or tinted to provide a particular type of illumination. The topcoat 17 may be applied to create a specific color over both the illuminated area and the non-illuminated area. The topcoat 17 may also be clear or tinted and combined with specific color for the light source 20 to create the desired illuminated and non-illuminated appearance of the component 10.

Thus, in view of the above, the component 10 may include the microtexture 40 that protrudes similarly to the protrusions 30 to create a textured outer surface over a predetermined area. The outer surface may have a similar textured appearance over the predetermined area when the light sources 20 are not activated, and in response to activating the light sources 20, a portion of the textured outer surface, in particular the specific locations of the protrusions 30 acting as lenses, may become illuminated in contrast to the remainder of the textured outer surface that is no illuminated. The microtexture 40 described herein may also be applied to other above-described aspects having smooth outer surfaces between protrusions 30.

The microtexture 40 may have a constant size and shape in some aspects. However, in other aspects, the size and shape of each projection that creates the texture may vary, such that some portions are more "rough" than others. This difference in roughness may be accomplished by altering the spacing, altering the size and shape or the projection, or altering the height of the projections. It will also be appreciated that some portions of the outer surface may include the microtexture 40 with other portions of the outer surface being smooth.

Accordingly, in view of the above description, the component 10 having the transmissive portion 12 and protrusions 30 thereof, with the plateable portion 14 overlaying the transmissive portion 12 and receiving the protrusions along with a finish portion 16 being plated on the plateable portion 14, provides for a metal plated decorative appearance capable of appearing translucent or otherwise appearing illuminated when the light is transmitted through the transmissive portion 12. When no light is transmitted, the component 10 may appear similar to traditional metal plated components. The appearance of the light exiting the component 10 may be tailored by altering the shape of the protrusion 30 to direct and/or diffuse the light passing through the transmissive portion and exiting the component 10.

Figure 13:
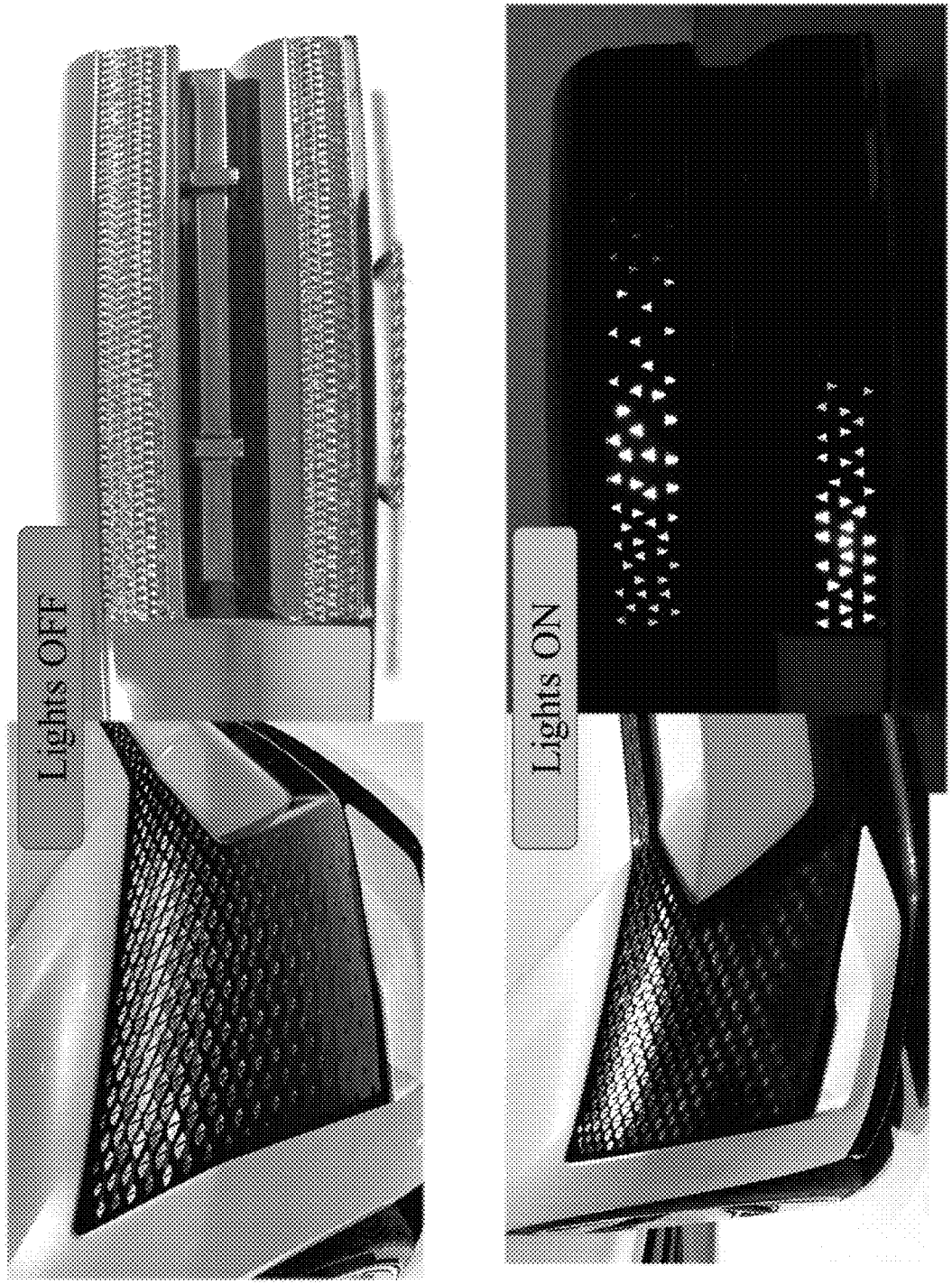
FIG. 13 illustrates examples of the microtexture and protrusions in both a lights on state and a lights off state.

FIG. 13 illustrates one aspect of the component 10 having the microtexture 40 and the protrusions, illustrating both a lights on state and a lights off state. In the lights off state, the microtexture 40 and the protrusions 30 combined to defined a textured outer surface where the protrusions 30 and microtexture 40 are generally indistinguishable in appearance, thereby providing a consistent textured surface across a predetermined area. In the lights on state, a lighted pattern is defined by the protrusions 30 acting as a lens to emit light from the light sources 20, which appears in contrast to the non-lighted microtexture 40. Accordingly, the protrusions 30 may blend into the microtexture 40 in the lights off state and mimic the textured geometric surface defined by the microtexture.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A decorative vehicle component comprising:
   a transmissive portion comprising a resin material configured to carry light through the transmissive portion;
   a plateable portion attached to the transmissive portion and comprising a resin material configured to receive a metal material via electroplating, wherein the plateable portion overlays a portion of the transmissive portion;
   a metal finish portion applied to the plateable portion, wherein the metal finish portion overlays the plateable portion;
   a plurality of openings defined by gaps in the finish portion and the plateable portion, wherein light carried by the transmissive portion exits the component through the openings.

2. The decorative vehicle component of claim 1, wherein the transmissive portion is non-conductive and non-plateable via electroplating.

3. The decorative vehicle component of claim 1, wherein the transmissive portion includes a base portion and a plurality of integral protrusions extending away from the base portion of the transmissive portion, wherein the protrusions extend at least partially into the openings of the plateable portion.

4. The decorative vehicle component of claim 3, wherein the metal finish portion includes an outer surface, and wherein at least one of the protrusions extends beyond the outer surface of the metal finish portion, wherein the protrusion includes a side portion, and wherein a portion of the finish portion extends along the side portion of the protrusion to define a blocked portion of the protrusion to block light from being emitted from the blocked portion.

5. The decorative vehicle component of claim 1, wherein the plurality of openings are spaced apart from each other at different distances.

6. The decorative vehicle component of claim 1, wherein the plurality of openings are arranged to define a logo.

7. The decorative vehicle component of claim 1, wherein the plateable portion includes an outer surface, and wherein the plateable portion has a variable thickness, and at least one of the plurality of openings is arranged at an oblique angle relative to the outer surface of the plateable portion.

8. The decorative vehicle component of claim 1 further comprising at least one light source disposed adjacent the transmissive portion, wherein the transmissive portion is disposed between the light source and the plateable portion.

9. The decorative vehicle component of claim 8, wherein the plateable portion includes a projection, and the transmissive portion defines a trough defining a cavity therein, wherein the projection of the plateable portion extends into the cavity.

10. The decorative vehicle component of claim 9, wherein the projection of the plateable portion is disposed between the light source and at least one of the plurality of protrusions to block light from light source.

11. The decorative vehicle component of claim 1, wherein the transmissive portion includes one or more optics formed therein to direct light therethrough.

12. The decorative vehicle component of claim 1, wherein the transmissive portion is tinted or diffused.

13. The decorative vehicle component of claim 1, further comprising a coating layer painter over a portion of the finish layer.

14. The decorative component of claim 1, further comprising a plurality of lights disposed adjacent the transmissive portion, wherein the plurality of lights are illuminable at different times or sequenced to create an animated effect.

15. A decorative vehicle component comprising:
a transmissive portion comprising a resin material configured to carry light through the transmissive portion;
a plateable portion attached to the transmissive portion and comprising a resin material configured to receive a metal material via electroplating, wherein the plateable portion overlays a portion of the transmissive portion;
a finish portion applied to the plateable portion, wherein the finish portion overlays the plateable portion;
a plurality of openings defined by gaps in the finish portion and the plateable portion, wherein light carried by the transmissive portion exits the component through the openings;
wherein the plateable portion includes a microtexture projecting outwardly therefrom.

16. The decorative vehicle component of claim 15, wherein the microtexture is overlaid by the finish portion.

17. The decorative vehicle component of claim 15, wherein the transmissive portion includes a base portion and a plurality of integral protrusions extending away from the base portion of the transmissive portion, wherein the protrusions extend at least partially into the openings of the plateable portion, wherein the protrusions and microtexture combine to define a textured outer surface over a predetermined area.

18. The decorative vehicle component of claim 17, wherein in a lights off state the predetermined area has a generally consistent outer texture, and in a lights on state an illuminated pattern is defined by the protrusions within the predetermined area.

19. The decorative component of claim 15, further comprising a plurality of lights disposed adjacent the transmissive portion, wherein the plurality of lights are operable in a predetermined sequence to create an animated effect.

20. The decorative component of claim 19, wherein the plateable portion blocks individual ones of the plurality of lights from individual ones of the plurality of openings.

21. A method of transmitting light from a decorative vehicle component, the method comprising the steps of:
forming a transmissive portion comprising a resin material configured to carry light through the transmissive portion;
forming a plateable portion attached to the transmissive portion and comprising a resin material configured to receive a metal material via electroplating, wherein the plateable portion overlays a portion of the transmissive portion;
wherein the plateable portion includes a plurality of openings extending therethrough, wherein the transmissive portion is exposed through the openings;
electroplating the plateable portion with a metal finish layer, wherein the transmissive portion remains exposed through the metal finish layer at the locations of the plurality of openings;
transmitting light from a light source disposed adjacent the transmissive layer;
transmitting light through the transmissive layer toward the plurality of openings;
emitting light from the plurality of openings via the transmissive portion.

22. The method of claim 21, wherein the transmissive portion includes a plurality of protrusions, the method further comprising inserting the plurality of protrusions into the plurality of openings.

23. The method of claim 22, wherein the plateable portion includes a microtexture projecting outwardly therefrom, wherein the protrusions and microtexture combine to define a textured surface over a predetermined area, the method further comprising illuminating a pattern defined by the protrusions within the predetermined area.

24. The method of claim 21, wherein the transmissive portion defines a plurality of troughs with cavities therein, and the plateable portion projects into the cavities and extends between the light source and at least one of the openings.

25. The method of claim 21, further comprising redirecting light passing through the transmissive portion via optics formed in the transmissive portion.

26. The method of claim 21, further comprising activating a plurality of lights in sequence to define an animation.

* * * * *